Patented Dec. 22, 1931

1,837,971

UNITED STATES PATENT OFFICE

ALFRED JOSEPH, OF ENGHIEN, FRANCE, ASSIGNOR TO COMPAGNIE INTERNATIONALE POUR LA FABRICATION DES ESSENCES ET PETROLES, OF PARIS, FRANCE, A LIMITED JOINT STOCK COMPANY OF FRANCE

CONTACT MATERIALS FOR CATALYTIC CRACKING AND LIKE OPERATIONS

No Drawing. Application filed November 5, 1929, Serial No. 405,066, and in France November 10, 1928.

This invention relates to an improved contact material for use in catalytic cracking operations.

It is known that alkaline, alkaline earth and other silicates, particularly silicate of alumina, constitute excellent carriers for metallic or oxymetallic catalytic agents, and that they may even be employed alone as contact materials for cracking operations on natural or other oils.

Usually as carriers or porous contact materials, fuller's earth, infusorial earth and other similar substances are employed.

Hitherto natural silicates in the activated form, that is to say freed from their impurities by treatment with the aid of acids, have been employed, when it is desired to decolour and purify oils.

The applicant has recognized that, particularly for cracking operations, a silicate of alumina must respond to a series of conditions enabling it first to serve as an energetic absorbent of the oils to be treated with a view to cracking, then to preserve its shape and reassume its initial state when, with a view to its regeneration, it is freed, for example by means of a stream of air or oxygen, of carbon deposits and other impurities which it has retained. In consequence the applicant has recognized that it is indispensable to subdivide the silicate into a multiplicity of units providing between them interstices for the easy passage of both the material to be treated and also the regenerating agent, which leads to moulding the silicate in the form of small units, and requires in consequence the use of a binder. On the other hand the use of a binder involves the presence of impurities, which during the regeneration give rise to the formation of fusible silicates such as silicate of iron. Such fusible silicate obstructs the pores of the active silicate and in consequence reduces or destroys the activity of the latter. It is therefore important not to encourage, by the presence of an excessive proportion of binder, the formation of fusible silicates during the regeneration.

According to the invention, a contact material fulfilling all the desired conditions of plasticity for its formation and of composition for its restoration to activity, is obtained by constituting the same of a mixture of an activated silicate of alumina and of a plastic silicate such as clay, the latter being present in the mixture in a maximum proportion of 30%. Moreover, the mixture, according to the invention, preferably comprises an addition of a small quantity of free alumina produced in the mixture of active silicate and binder by precipitation under the action, for example, of soda on sulphate of alumina, the alumina having the well known property of preventing the free silica entering into combination.

An excellent material according to the invention can be obtained by operating as follows:

Eighty-five parts of activated silicate of alumina and twelve parts of argillaceous silicate of alumina are slaked in cold water. There is precipitated by soda (NaOH), 3% of free alumina from sulphate of alumina which may be added to the mixture. The sulphates are removed by successive washings.

The mass thus prepared is moulded into little annular units preferably of 7 to 8 millimeters external diameter, 2½ to 3 millimeters internal diameter and 10 to 20 millimeters in height. The rings formed are stave dried and are then ready to be used.

Claims:
1. The method of making a contact material for catalytic reactions consisting in first slaking activated silicate of alumina and argillaceous silicate of alumina and then adding a mixture of a sodium compound with sulphate of alumina whereby free alumina is precipitated.

2. The method of making a contact material for catalytic reactions, consisting in first slaking activated silicate of alumina and argillaceous silicate of alumina, next adding a mixture of a sodium compound with sulphate of alumina whereby free alumina and sulphates are produced, and then removing the sulphates.

3. A contact material for catalytic reactions consisting of 85% activated silicate of alumina, 12% of argillaceous silicate of alumina and 3% of free alumina.

4. A contact material for use in catalytic reactions and the like, said material containing an activated silicate of alumina mixed with an argillaceous binder, the proportion of said binder present in the mixture being not greater than 30%, said material also containing a small proportion of free alumina.

5. A contact material for use in the catalytic cracking of oils consisting of 70-85% of an activated silicate of alumina and 30-15% of an argillaceous binder.

In testimony whereof I have signed this specification.

ALFRED JOSEPH.